United States Patent [19]

Storey et al.

[11] Patent Number: 5,039,752

[45] Date of Patent: Aug. 13, 1991

[54] STAR-BRANCHED THERMOPLASTIC IONOMERS

[75] Inventors: Robson F. Storey; Scott E. George, both of Hattiesburg, Miss.

[73] Assignee: The University of Southern Mississippi, Hattiesburg, Miss.

[21] Appl. No.: 294,320

[22] Filed: Jan. 6, 1989

[51] Int. Cl.$^5$ ............................................. C08F 293/00
[52] U.S. Cl. .................................... 525/314; 525/353; 149/19.9
[58] Field of Search ................................. 525/314, 353

[56] References Cited

U.S. PATENT DOCUMENTS 3,577,357  5/1971  Winkler ................................. 525/353
3,985,830  10/1976  Fetters et al. ......................... 525/314

Primary Examiner—John C. Bleutge
Assistant Examiner—Vasu S. Jagannathan
Attorney, Agent, or Firm—George W. Rauchfuss, Jr.

[57] ABSTRACT

Novel star-branched ionomers having at least three branches covalently bonded to a central linking moiety; each branch contains a long inner block comprising non-ionic mers and an outer block comprising at least two ionic mers. Elasticity is provided by the non-ionic blocks and the ionic outer blocks aggregate at room temperature but dissociate and higher temperature, giving the star-branched ionomers thermoplastic characteristics. Star-branched polymers may be provided by growing a first (outer) block as a linear polymer, growing a second (inner) block from the end of the living polymer, linking three or more such linear block polymers to a central linker compound and selectively ionizing the first blocks.

5 Claims, 4 Drawing Sheets

STAR-BRANCHED THERMOPLASTIC IONOMERS

The present invention is directed to novel thermoplastic ionomers which may be used, for example, as elastomeric binders in high-energy compositions, such as propellants, explosives, gasifiers, or the like.

BACKGROUND OF THE INVENTION

Solid high-energy compositions, such as propellants, explosives, gasifiers, or the like, comprise solid particulates, such as fuel particulates and oxidizer particulates, dispersed and immobilized throughout a binder matrix comprising an elastomeric polymer.

Conventional solid composite propellant binders utilize cross-linked elastomers in which prepolymers are cross-linked by chemical curing agents. As outlined in detail in U.S. Pat. No. 4,361,526, there are important disadvantages to using cross-linked elastomers as binders. Cross-linked elastomers must be cast within a short period of time after addition of the curative, which time period is known as the "pot life". Disposal of a cast, cross-linked propellant composition is difficult, except by burning, which poses environmental problems. Furthermore, current state-of-the-art propellant formulations have serious problems that include, but are not limited to, use of nonenergetic binders, high end-of-mix viscosities, thermally labile urethane linkages, and extreme vulnerability to unscheduled detonation.

In view of inherent disadvantages of cross-linked elastomeric polymers as binder matrices, there has been considerable interest in developing thermoplastic elastomers suitable as binder matrices for solid, high-energy compositions. However, many thermoplastic elastomers fail to meet various requirements for propellant formulations, particularly the requirement of being processible below about 120° C., it being desirable that a thermoplastic polymer for use as a binder in a high-energy system have a melting temperature of between about 60° C. and about 120° C. Many thermoplastic elastomers exhibit high melt viscosities which preclude high solids loading and many show considerable creep and/or shrinkage after processing.

The present invention is directed to telechelic polymers that exhibit thermoplastic elastomeric characteristics and which are useful as binders in high-energy compositions. These polymers belong to the general family of materials termed ionomers, i.e., non-polar, often hydrocarbon, polymers which contain bound ionic moieties.

U.S. Pat. No. 3,870,841, the teachings of which are incorporated herein by reference, is directed to polystyrene which is randomly sulfonated. U.S. Pat. Nos. 3,642,728 and 4,184,988, the teachings of which are also incorporated herein by reference, are directed to the sulfonation of olefinically unsaturated elastomers such as butyl rubber and ethylene-propylene-diene rubber (EPDM) at the diene-derived unsaturations which are present at random points along the polymer chain. These works also teach that the resulting sulfonated elastomers can be reacted with alkali metals, alkali metal hydroxides, amines, amine derivatives, etc., to form ionic sulfonic acid salts. The ionic sulfonate moieties tend to aggregate at lower temperatures, which aggregation is destroyed at higher temperatures, whereby these polymers exhibit thermoplastic characteristics. The processes described in these patents yield polymer molecules consisting of two non-functional hydrocarbon chain ends, and one or more elastically effective inner segments which are bounded by the ionic moieties. The topology of the network derived from sulfonate aggregation, regardless of the average number of ion pairs which participate in an aggregate, is such that no covalent branch points exist, and each primary polymer chain contributes two dangling, non-load-bearing ends. If a polymer chain is sulfonated at only one point, it contains no inner segments and cannot participate in the load-bearing funtion. Because of these limitations, the molecular weight of the primary polymer chains, and the level of sulfonation, must be sufficiently high to develop adequate toughness and strength, and this results in undesirably high melt viscosities.

Star-branched, low molecular weight, telechelic ionomers have been shown to make excellent thermoplastic elastomers with very low melt viscosities; J. P. Kennedy et al., *ACS Org. Coat. Appl. Polym. Sci. Pro.*, 46 182 (1982), Y. Mohajer et al., *Polym. Bull.*, 8, 47 (1983), and S. Bagrodia et al., *J. Appl. Polym. Sci.*, 29 (10), 3065 (1984). These works deal with polyisobutylene (PIB)-based ionomers. The structure of a three-arm star PIB ionomer is shown in FIG. 1. The covalent branch point of the star dramatically increases ionomer network connectivity. Because the ionic groups are placed only at the chain ends, the network is free of non-loadbearing chain ends. A disadvantage of these polymers is that PIB is not very resilient at room temperature, and it has a high melt viscosity compared to other elastomers. Another disadvantage is that there is inherently only one ionic group per chain end; thus, there is no way to change ionic concentration independently of molecular weight.

There exists a need for novel thermoplastic elastomers which can be used as binders in high-energy compositions.

SUMMARY OF THE INVENTION

In accordance with the present invention, there are provided novel star-branched, telechelic ionomers. These ionomers are thermoplastic elastomers which are useful, for example, as binders in high-energy compositions, such as rocket motor propellants. An ionomer which is a thermoplastic elastomer (TPE) in accordance with the present invention has at least three branches or arms covalently bonded to a central linking chemical moiety. The inner segments of each branch is a non-ionic hydrocarbon block. The outer end of each branch is a block of at least two mers which each contains an ionic species.

DETAILED DESCRIPTION OF CERTAIN PREFERRED EMBODIMENTS

Figure 1:
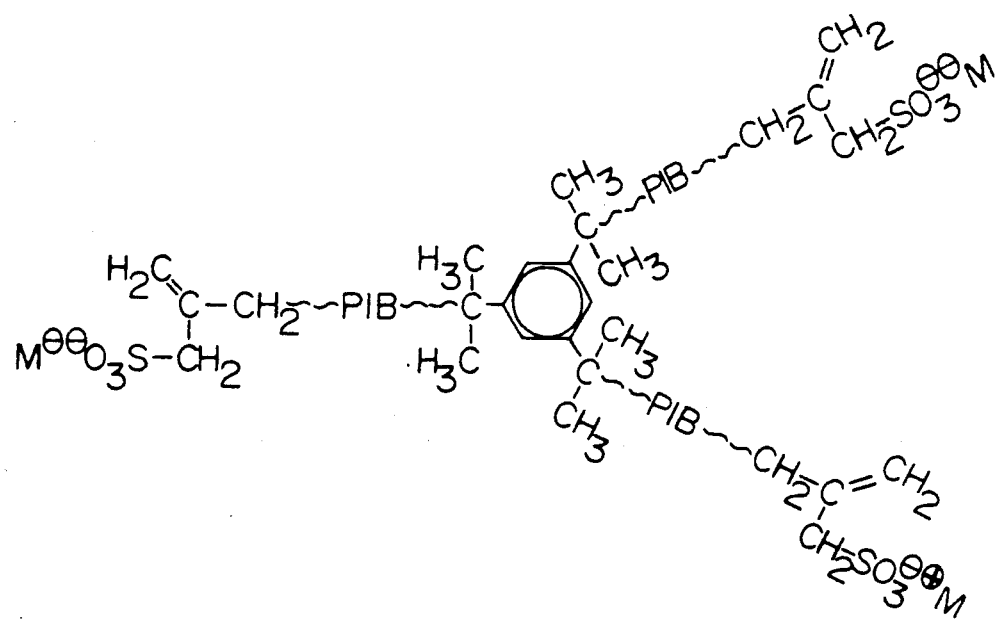
FIG. 1 is an illustration of a prior art three-branch star-ionomer, described above, in the Background of the Invention.

Novel star-branched, telechelic, elastomeric ionomers are synthesized so as to have at the end of each branch a block of at least two, and as many as desired, mers which contain (or to which are bound) ionic species. The inner ends of the branches are blocks of non-ionic hydrocarbon chains which are amorphous at room temperature, e.g., 20° C., and preferably below. The non-ionic hydrocarbon blocks are selected to be elastic in nature and to provide a low melt viscosity. The outer ionic blocks are polyelectrolyte and aggregate at lower temperatures, preferably ensuring that the star-branched ionomers are solids at 20° C. and more preferably providing a melt temperature in the range of about 60° C. to about 120° C. As a consequence of the ionomers having the amorphous non-ionic elastic blocks, the ionomers are thermoplastic elastomers.

There need only be sufficient ionic units in the ionic blocks to ensure aggregation of the ionomers, while the non-ionic blocks should be sufficiently long to provide a desired degree of elasticity. Accordingly, the molar ratio of mers which comprise (in modified or unmodified form) the inner non-ionic blocks to the mers which comprise the outer ionic blocks is preferably about 10:1 or greater, although the relative number of mers used in the ionic and non-ionic blocks may be varied over a wide molar ratio. In contrast to the PIB-based ionomers discussed above, which have a single ionic unit at the end of each branch, the ionomers in accordance with the invention have at least two ionic mers and preferably at least five such mers in each ionic block at the end of each branch. Substantially improved aggregation is thereby achieved. The number of ionic mers which the ionic blocks may contain is independent of the molecular weight of the star-branched ionomer.

For use in high-energy compositions, it is preferred that the molecular weight of the ionomer, including ionic blocks, non-ionic blocks, and linking moiety, be relatively low, e.g., in the range of about $5000M_n$ to about $30,000M_n$.

To obtain superior network connectivity through aggregation of the polyelectrolyte ends, the star-branched ionomers should have at least three branches. In some cases, a mixture of star-branched ionomers having at least three branches and linear polymers having ionic block ends may form a sufficiently aggregated network. There is no specific limit to the number of branches a star-branched ionomer may have, although there is not necessarily any advantage in having more than three branches. The number of branches that a star-branched ionomer will have will often depend upon synthetic considerations, e.g., the number of functional groups on the linker compound to which branches may attach.

Although certain preferred synthesis are described herein, the invention is not limited to the method by which the ionomers are formed. The branches may be formed as living polymers in which one block is formed first by sequential polymerization of one type of polymerizable unit followed by sequential polymerization of a second type of polymerizable unit; the two-block units are then joined to a linker compound which bonds to the non-ionic block of three or more of such linear branches. As an alternative, the ionic and non-ionic branches may be separately prepared, subsequently joined together, and then joined to the linker compound. As further alternatives, the non-ionic blocks may be joined to or grown from a linker compound and the ionic block subsequently joined thereto or grown therefrom. The ionic moieties of the mers of the ionic block may either be initially present on the mer units or may be added thereto, either after formation of the chains which are to serve as branches or after synthesis of the entire star-branched polymer.

The ionic and/or the non-ionic blocks may be otherwise altered after synthesis of the blocks or after synthesis of the entire star-branched polymer in order to achieve desired results. For example, unsaturation in the non-ionic block may be removed by hydrogenation to ensure that ionic species do not subsequently attach to unsaturated bonds in a reaction which attaches ionic species to the blocks which are to serve as the ionic blocks.

Figure 2:
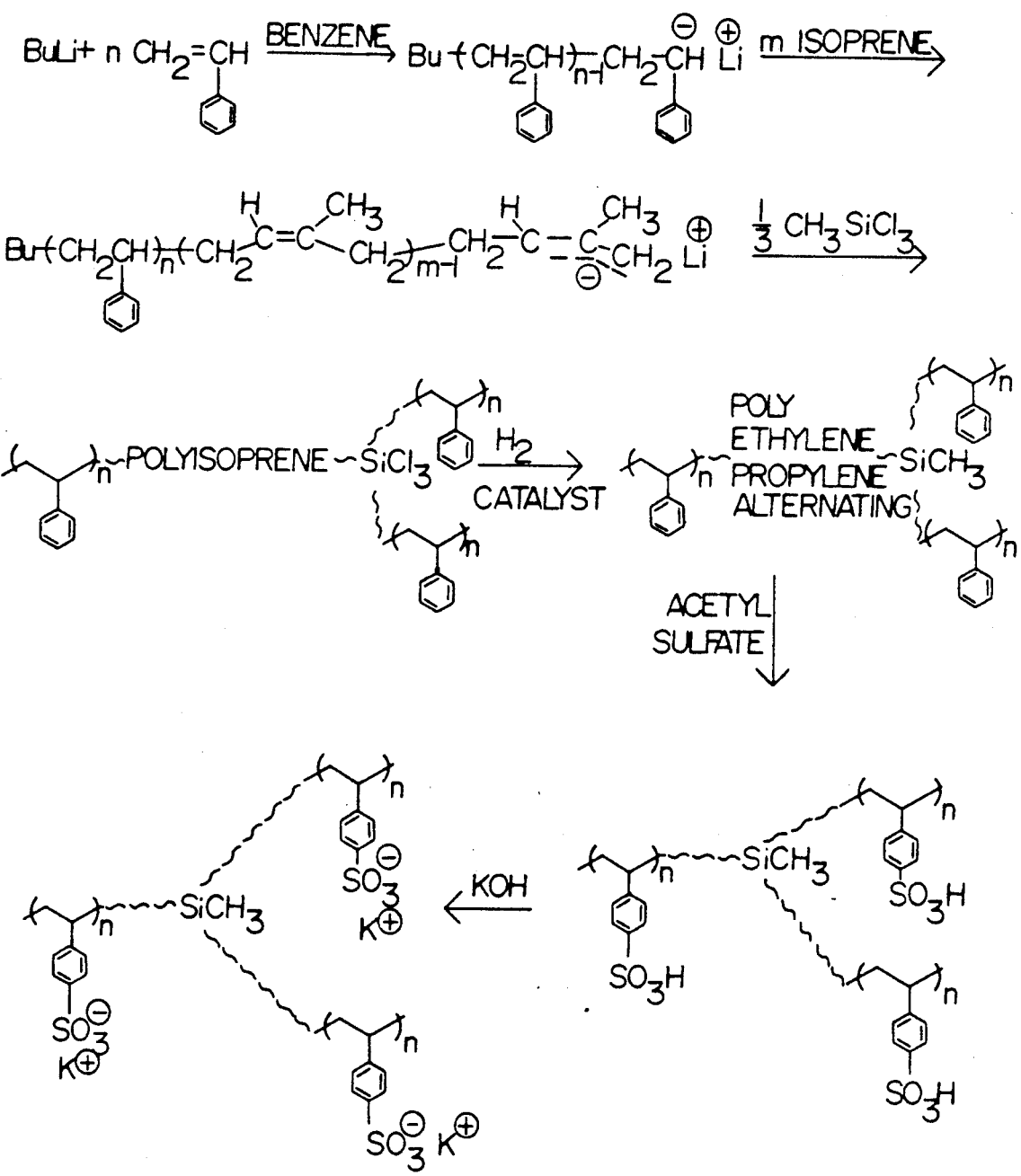
FIG. 2 illustrates a series of chemical steps used to form a three-branch star ionomer in accordance with the present invention.

Illustrated in FIG. 2 is a series of chemical steps by which a star-branched ionomer in accordance with the present invention is produced. Initially, styrene units (which are intended to be later modified to provide the ionic mers) are polymerized by conventional anionic polymerization. In this case, butyl lithium is used as the initiator; however, other initiators of anionic polymerization known in the art may be substituted. The polymerization proceeds until the styrene monomers are substantially depleted; thus the chain length of the polystyrene block is determined by the molar ratio of initiator molecules to styrene molecules.

The resulting polystyrylithium polymer is a "living polymer" having an anionic terminal end with a lithium cation, whereby the chain itself becomes an initiator for anionic polymerization. Subsequently, the conjugated diene, isoprene, is added to the reaction mixture. Anionic polymerization of the isoprene molecules is initiated by the ionic end of the living polymer, and polymerization proceeds until substantially all of the isoprene units are exhausted, the length of the polyisoprene block thereby being determined. In a non-polar solvent, such as benzene, substantially all of the isoprene enchainment is 1,4, as shown.

Polymerization of the isoprene units again leaves a polymer with a terminal anionic end with a lithium cation. This provides a convenient means of joining several such linear branches to a linker compound to form a star polymer. In the scheme illustrated, the linker compound is trichloromethylsilane, which reacts with three polymer chains to form a tri-star-polymer. Linkage with chlorosilanes is described, for example, by M. Morton et al., *J. Polym. Sci.*, 57, 471 (1962). The trichloromethylsilane is provided at approximately a one-third molar ratio relative to the polymer chains, i.e., relative to the initiator species originally added. If it is desired to have additional branches on the star-polymer, a more complex chlorosilane, e.g., 1,2-bis(trichlorosilylethane), may be used as the linker compound.

In the final steps of the reaction sequence, the phenyl moieties of the polystyrene mers are to be sulfonated, and the resulting sulfonic acid moieties are to be neutralized to form, for example, the alkali metal salt of the sulfonic acid. The same conditions which sulfonate the polystyrene block would sulfonate, at least to some extent, the unsaturated polyisoprene block. As it is intended that the blocks directly linked to the central linking moiety be non-ionic, saturation of the polyisoprene units is achieved by hydrogenating the star-branched polymer. Hydrogenation may be carried out, for example, by reaction with hydrogen gas in the presence of a catalyst, or by other methods familiar to those skilled in the art, e.g., reaction of the polymer with p-toluene sulfonyl hydrazide. The polyisoprene block is thereby converted to a saturated polymer of repeating ethylene and propylene units.

As noted, the last steps of the synthesis are sulfonation and neutralization. This is achieved by reacting the star polymer with a sulfonating agent, such as acetyl sulfate or the sulfate of another carboxylic acid, using a moderately polar solvent such as methylene chloride. Other sulfonating agents known to sulfonate phenyl groups may also be used. Generally, a single sulfonate group is added to each phenyl group at the para (4) position. The polymer is then reacted with an alkali metal, an alkali or alkaline earth metal hydroxide, a metal acetate such as zinc acetate, an amine, etc., to form the ionic sulfonate moieties.

A variation of this synthesis would be to use butadiene to form the non-ionic block. However, a substantial number of 1,2 additions of butadiene units must be promoted so that after hydrogenation, sufficient side-chain hydrocarbon groups exist to provide elasticity of the non-ionic blocks. If substantially all of the linkages of polybutadiene were 1,4 the non-ionic blocks after hydrogenation would be essentially polyethylene blocks which have very little elasticity. 1,2 additions are promoted by a more polar cosolvent, such as triethylamine, dioxane, or tetrahydrofuran (THF). 1,2 addition of isoprene blocks would similarly be promoted.

It may be appreciated that the synthetic scheme shown in FIG. 2 could be modified in a variety of manners. Polymerizable units which can be sulfonated, but which are not reduced under conditions of hydrogenation of the polydiene block may be substituted for styrene. A variety of linking chemicals might be reacted with the anionic block polymer branches.

Figure 3:
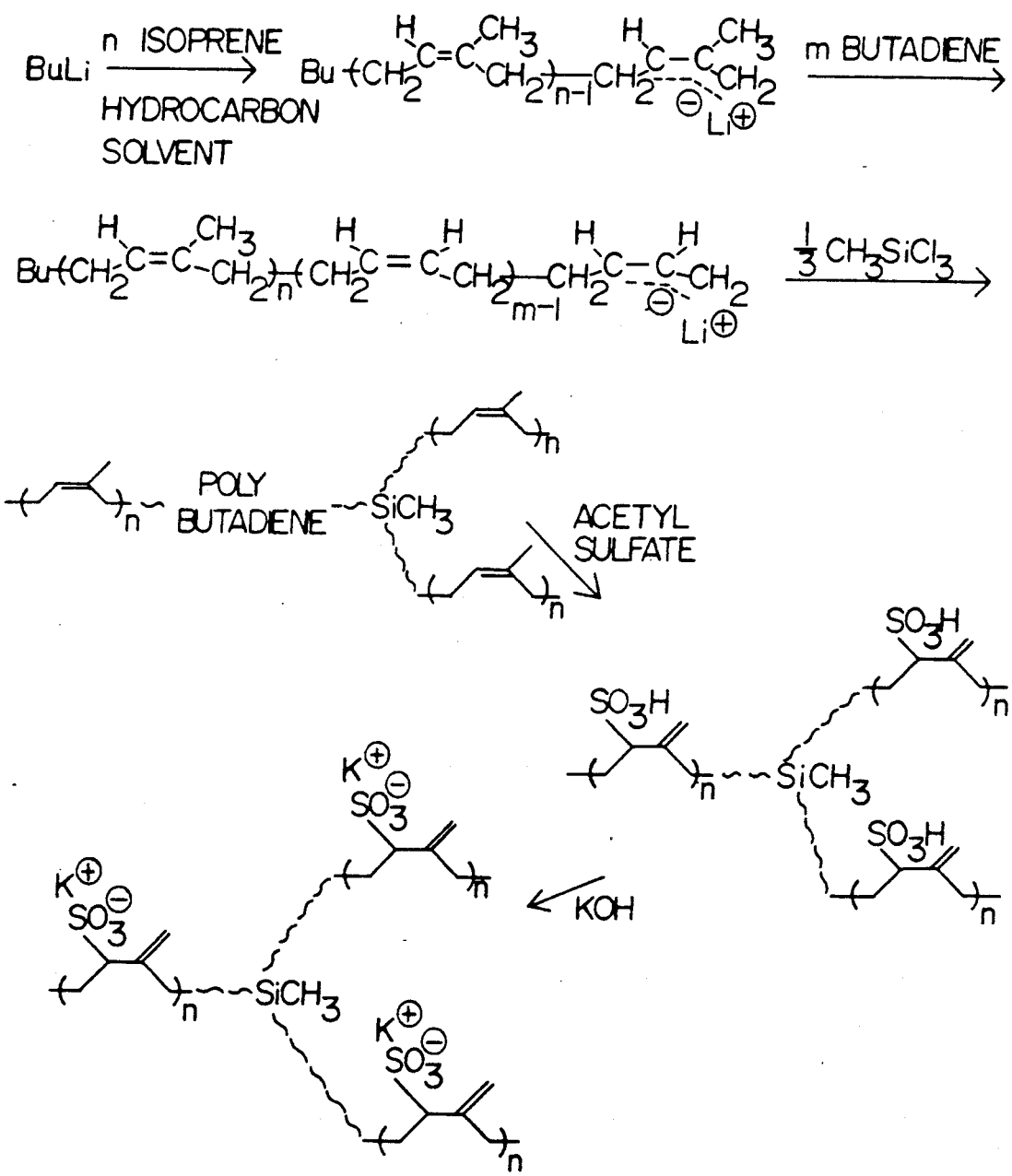
FIG. 3 illustrates a series of chemical steps used to form an alternative three-branch star polymer in accordance with the present invention.

Illustrated in FIG. 3 is an alternative scheme for producing a star-branched ionomer in accordance with the present invention. The star-branched ionomer which is produced has branches of short, sulfonated polyisoprene outer blocks and longer, unaltered polybutadiene inner blocks. A basis for synthesis of such a polymer is the selective sulfonation of those unsaturated carbon-carbon bonds which yield tertiary carbonium ions upon addition of an electrophilic moiety relative to sulfonation of other carbon-carbon double bonds. Thus, polyisoprene is selectively sulfonated relative to polybutadiene. Selective sulfonation is promoted by non-polar solvents, such as hydrocarbon solvents.

In the first step of this scheme, anionic polymerization of isoprene is initiated with an initiator, such as butyl lithium, the molar ratio of initiator to isoprene being selected to yield short polyisoprene blocks. The resulting linear living polymers are then reacted with butadiene to yield longer polybutadiene blocks. The non-polar solvent helps to ensure a predominance of 1,4 additions, which are necessary for the polybutadiene blocks to have desired elasticity.

Next, the living polymer is reacted with trichloromethylsilane to yield a star-branched polymer.

Next, the star-branched polymer is sulfonated, e.g., with acetyl sulfate in hexane. The selective sulfonation of the terminal polyisoprene blocks relative to the inner polybutadiene blocks provides that the polybutadiene blocks retain their elastomeric properties, while the terminal polyisoprene blocks agglomerate at lower temperatures.

Finally, the sulfonated star-branched polymer is neutralized to form the ionomer.

Figure 4:
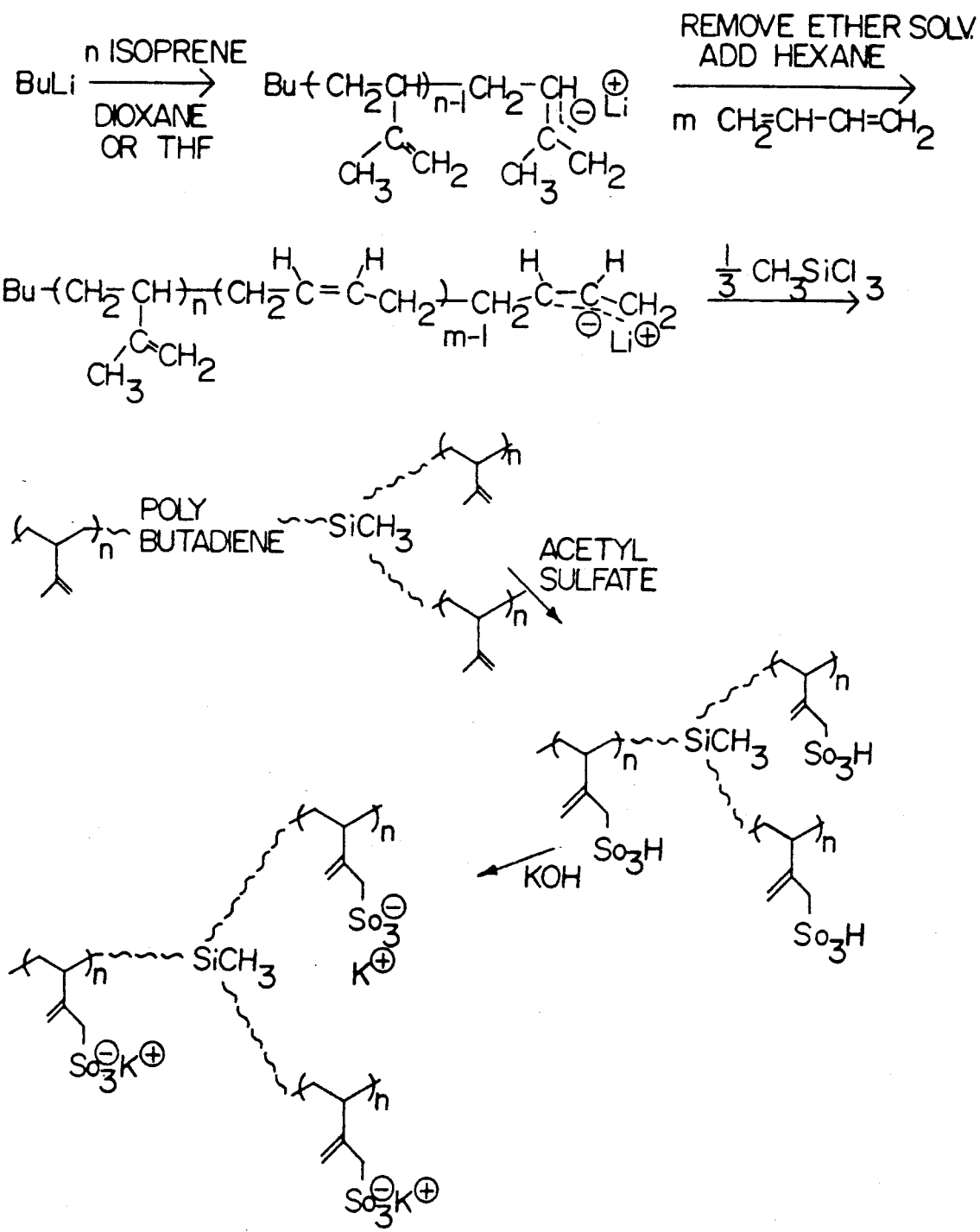
FIG. 4 illustrates a series of chemical steps used to form another alternative three-branch star polymer in accordance with the present invention.

The scheme shown in FIG. 4 is substantially the same as that shown in FIG. 3 except that the isoprene blocks are grown in a more polar solvent, such as dioxane or THF. This provides that isoprene enchainment is predominantly 3,4 and that the unsaturation occurs in the form of pendant isopropenyl groups, which are even more susceptible to sulfonation in the final step, relative to the polybutadiene blocks. Again it is preferred that the polybutadiene block be grown from the end of the living polymer in a non-polar medium to ensure predominantly 1,4 addition which is consistent with polybutadiene elasticity; thus, the solvent must be changed after growth of the polyisoprene block. Again, the linear branches are linked, e.g., with trichloromethylsilane, subsequently sulfonated, e.g., with acetyl sulfate, and finally neutralized, e.g., with an alkali metal hydroxide.

At present, the scheme shown in FIG. 2 is preferred relative to the schemes shown in FIGS. 3 and 4. Although polyisoprene, including that resulting from both 1,4 and 3,4 additions, is substantially more readily sulfonated than polybutadiene, complete selectivity is difficult to achieve. There is some tendency of these polymers to char during the sulfonation step due to the minor level of sulfonation of the polybutadiene blocks.

It may readily be appreciated that the number of ionic mers at the ends of these star-branched polymers may be easily varied and that the relative chain lengths of ionic and nonionic blocks may also be varied to achieve desired characteristics of the star-branched ionomers. Like previously described PIB-based star-branched ionomers, the aggregated network of star-branched ionomers is free of non-load-bearing branch ends.

The presently preferred ionic moiety for the outer polyelectrolyte blocks is sulfonate. However, those with ordinary skill in the art will recognize that other ionic moieties, such as carboxylate, ammoniums, and phosphates will serve a similar purpose.

The invention will now be described in greater details by way of specific examples.

EXAMPLE I

All materials with the exception of n-butyl lithium (Lithco) were rigorously purified using standard high vacuum techniques, M. Morton et al., *J. Rubber Chem. and Technol.*, 48, 359 (1975). Isoprene was supplied by Eastman Kodak; all other chemicals were obtained from Aldrich. The polymerization procedure was as follows: A 1000 ml round-bottom flask with magnetic stir bar was attached to the vacuum line, evacuated, and flamed with a hand torch several times to remove surface moisture. Approximately 600 ml of benzene was distilled into the vessel from an oligostyryl lithium solution, and 0.075 mol of styrene was then transferred into the reactor by distillation from dibutyl magnesium. The mixture was then frozen using a dry ice/isopropanol bath, and the vacuum was broken with argon. A syringe was then used to add 0.015 mol of n-butyl lithium-in-hexane solution, to the reactor under a blanket of argon, after which the reactor was reattached to the vacuum line and re-evacuated. After the contents were brought to ambient temperature, the initiation reaction of the styrene was allowed to proceed for 24 hours, during which time a deep orange color formed which is characteristic of oligostyryl anions. Distillation was then employed to transfer 0.99 mol of isoprene into the reaction mixture, and after 48 hours the color progressed from a deep orange to a pale yellow. Under a blanket of argon, 0.003 mol of methyl trichlorosilane were added to couple 60% of the theoretical number of polymer chains, and during a time period of 36 hours, a gradual increase in viscosity was noted. The remaining 40% of coupling agent was added in three separate aliquots over a 36 hour period, during which time the yellow color disappeared almost completely. Precipitation into degassed methanol was used to recover the polymer, and two more precipitations into methanol from hexanes were then employed to complete the work-up. The molecular weights of the branch and star polymers were approximately 5000 and 15,000 g/mol respectively.

To achieve absolute selectivity of the sulfonation reaction, the isoprene inner blocks were hydrogenated to yield a fully saturated ethylene/propylene (EP) elastomer. A diimide technique, L. Mango et al., *Makromol. Chem.*, 163, 13 (1973) was used to selectively hydrogenate under mild conditions. The transitory diimide species was generated in situ from p-toluene sulfonyl hydrazide (TSH), which was obtained from Aldrich. The actual procedure consisted of charging 10 g of polymer (0.147 mol of isoprene repeat units) to a 250 ml round-bottom flask equipped with a reflux condenser and heating mantle. Sufficient xylene was added to make a 7% (w/w) solution, and after the polymer had completely dissolved, 82 g of TSH (0.44 mol) were then added to obtain a 3:1 molar ratio of TSH to isoprene repeat units. When the reaction was brought to reflux conditions, at 135°–140° C., the original two-phase mixture changed to a slightly turbid, yellow-green homogeneous solution. After heating at reflux for 16 hours, the material was transferred to a refrigerator and allowed to cool. After 12 hours, the supernatant solution was decanted from a white crystalline by-product. Workup was completed by precipitating the polymer into methanol, followed by two more dissolution/precipitations with hexanes and methanol, and vacuum drying at 60° C. for 12 hours.

The extent of hydrogenation by diimide appears to be greater than 99%, as evidenced by FT-IR, $^1$H NMR, and $^{13}$C NMR. In the FT-IR spectrum, the total disappearance of the C=C stretches around 1650 cm$^{-1}$ indicated 100% hydrogenation; however the 60 MHz $^1$H NMR spectrum indicated a very small amount of residual olefin evidenced by a very weak resonance located near 5 ppm. Copolymer composition was estimated from the $^{13}$C 200 MHz spectrum. Because hydrogenation appears virtually quantitative, the peaks between 120–150 ppm of the hydrogenated sample can be attributed solely to styrene. The peaks between 110–150 ppm of the unhydrogenated sample are for both the styrene and isoprene units; therefore, when the peak at 147 ppm is used to normalize the two spectra, the copolymer composition can be estimated by comparing the integral values of the two samples. Using this method, a value of 4.79 mol % for the amount of styrene in the block copolymer was obtained, which is in excellent agreement with the theoretical value of 5.0 mol %.

To sulfonate the styrene units at the ends of the EP-based star-block copolymer, acetyl sulfate was again chosen as the reagent of choice because it is reported to be effective for polystyrene sulfonation; R. D. Lundberg and H. S. Makowski, *ACS Symp. Ser.*, 187, 21 (1980), W. A. Thaler, *Macromolecules*, 16, 623 (1983), and is easily generated from concentrated sulfuric acid and acetic anhydride. The sulfonation reaction is much cleaner when the acetyl sulfate is added as a preformed, dilute solution in comparison to being generated in situ. It is found that the latter method results in considerable charring due to the temperature rise which results from the exothermic generation of acetyl sulfate. Therefore, a 0.20 molar solution of acetyl sulfate in methylene chloride was prepared from equimolar quantities of acetic anhydride and sulfuric acid. A typical experiment consisted of adding 2.0 g of polymer and 50 ml of CH$_2$Cl$_2$ to a 125 ml erlenmeyer flask equipped with a magnetic stir bar. The acetyl sulfate solution, in approximately 20% molar excess relative to the amount of styrene units present, was added dropwise, and the reaction was allowed to proceed for 60 minutes at room temperature. During the course of the reaction, the solution turned from a clear water white to a slightly yellow color. The reaction was terminated by pouring the contents of the flask into 150 ml of rapidly stirred deionized water, and the resulting two layers were allowed to settle overnight in a refrigerator. The top water layer was siphoned away, and the product solution was extracted with a fresh aliquot of deionized water to ensure removal of low molecular weight acids. This water layer was removed, and the sulfonated polymer was isolated by removal of the methylene chloride under a stream of dry nitrogen gas. The sulfonated polymer, in the form of friable white crumbs, was vacuum dried overnight at room temperature.

The extent of sulfonation was determined by titration with standarized KOH in ethanol, and the results indicate that greater than 60% of the styrene units were sulfonated. This amounts to an average of three potassium sulfonate units per chain end, and the presence of these ionic groups was quite apparent in the dramatic transformation of the material from a viscous liquid to an elastic solid.

EXAMPLE II

A 3-arm star isoprene/butadiene block copolymer was synthesized using standard high vacuum techniques, M. Morton et al., *J. Rubber Chem. and Technol.*, 48, 359 (1975). A brief summary of the polymerization procedure is as follows: Ampules containing sec-butyl lithium solution (in benzene) and benzene were released into a 250 ml all-glass high-vacuum apparatus, magnetic stirring was commenced, and sufficient isoprene was added from an ampule to form oligomeric chains five (5) units long. After stirring for 40 hours at 25° C., the mixture was frozen, and an amount of butadiene was distilled into the reaction mixture to add a block of 95 units to the living isoprene oligomers. The reaction mass was then thawed and stirred for 60 hours at room temperature. During this time, a slight increase in viscosity was noted, but the mixture remained clear and water-white. At this point, the living chains were linked with a stoichiometric amount of trichloromethyl silane, followed by precipitation into methanol. Work-up was completed by redissolution of the polymer into hexanes, washing the solution three times with water, drying the solution over MgSO$_4$, and finally removal of the solvent using a Rotovap.

Molecular weight was determined by GPC and vapor-phase osmometry (VPO). The $M_n$ was determined by VPO to be 14,800 g/mol, which is a reasonable number when compared to the theoretical molecular weight value of 16,200 g/mol. Analysis by GPC using a 500, 100, and 10$^5$ Å column set and refractive index detector gave proof of the existence of the 3-arm star species. From chromatograms, molecular weights of 12,600 for the arm species and 39,800 g/mol for the 3-arm star were obtained. These molecular weights are relative to polystyrene standards. In both cases, the molecular weight distribution (MWD) was less than 1.1. The value obtained by VPO for the star polymer was less than theoretical $M_n$, which is not surprising because a trace amount of uncoupled precursor remained in the polymer sample.

A large scale (75 g) batch of the 3-arm star isoprene/butadiene block copolymer was then synthesized using the procedure outlined above, to a molecular weight of 15,000 g/mol.

EXAMPLE III

A 3-arm star styrene/butadiene block copolymer was synthesized using standard high vacuum techniques, M. Morton et al., *J. Rubber Chem. and Technol.*, 48, 359 (1975). An example of the general polymerization procedure is as follows: A 1000 ml all-glass reactor was attached to the vacuum line and flamed with a hand torch to remove surface moisture. Approximately 500 ml of benzene was distilled into the apparatus and magnetic stirring was commenced. An ampule containing 0.0165 mol of sec-butyl lithium in benzene was released into the vessel through a breakseal. Styryl oligomers of an average length of four (4) units were then formed by opening an ampule containing 0.0655 mol of styrene monomer. The contents of the reactor changed in color from a clear water-white to a deep orange over the course of 24 hours at 25° C. To prepare for the addition of butadiene and to increase the amount of 1,2 enchainment in the polybutadiene segment, 0.717 mol of triethyl amine (TEA) was distilled into the reactor after being stirred over n-butyl lithium; the molar ratio of TEA/ living chain end was 45:1. The reaction mass changed to a dark red color during the step. An ampule containing 1.70 mol of 1,3 butadiene was then slowly released into the vessel, which was held at 10° C. by means of a constant temperature bath, over the course of five (5) hours. The viscosity of the mixture increased markedly during this period, and the color faded to a pale yellow. After warming the viscous solution to room temperature and stirring for an additional 48 hours, 0.0049 mol of methyl trichlorosilane in benzene solution was added from an ampule to couple the polymer chains and form the three-arm star polymer. The linking reaction was allowed to proceed at 40° C. for 72 hours.

The polymer was recovered by precipitation into methanol, followed by two additional precipitations from hexanes to complete the work-up. Stoichiometric molecular weights of the branch and star polymers were approximately 6,000 and 18,000 g/mol respectively. The microstructure of the polybutadiene segment was determined by $^{13}$C NMR to be 57% 1,4 and 43% 1,2 addition. Hydrogenation of the polymer was accomplished in the manner outlined in Example I and yielded a viscous noncrystalline product. The sulfonation reaction was also performed as in Example I, and after subsequent warm-water extraction and neutralization with KOH, an elastic solid was obtained.

While the invention has been described in terms of certain preferred embodiments, modifications obvious to one with ordinary skill in the art may be made without departing from the scope of the present invention.

Various features of the invention are set forth in the following claims.

What is claimed is:

1. A star-branched, telechelic, elastomeric, thermoplastic ionomer having a total molecular weight (number average) of between about 5000 and about 30,000 and a melting temperature of between about 60° C. and about 120° C. comprising:
   a central linking moiety,
   at least three branches covalently bonded to said central linking moiety, each of said branches having an elastic inner block consisting essentially of unmodified or modified hydrocarbon non-ionic mers which are amorphous at about 20° C. and below and an outer block comprising two or more mers having ionic moieties, wherein mers of said inner block to mers of said outer block are in a molar ratio at least about 10:1, and said ionomer is a solid at 20° C.

2. A star-branched ionomer according to claim 1 wherein said linking moiety is a silane moiety, said outer blocks are polystyrene blocks having ionic moieties selected from the group consisting of sulfonate, carboxylate, ammoniums, phosphates, mixtures thereof, and salts thereof.

3. A star-branched ionomer according to claim 2 wherein said ionic moieties of said outer blocks are sulfonate or a salt thereof and the ionomer has three branches.

4. A star-branched ionomer according to claim 1 wherein said outer blocks are polyisoprene blocks having ionic moieties selected from the group consisting of sulfonate, carboxylate, ammoniums, phosphates, mixtures thereof, and salts thereof, and said inner blocks are polybutadiene blocks.

5. A star-branched ionomer according to claim 4 wherein said ionic moieties of said outer blocks are sulfonate or a salt thereof and the ionomer has three branches.

* * * * *